US007139779B1

(12) United States Patent
Kornelson et al.

(10) Patent No.: US 7,139,779 B1
(45) Date of Patent: Nov. 21, 2006

(54) METHOD AND SYSTEM FOR DEVELOPING EXTRACT TRANSFORM LOAD SYSTEMS FOR DATA WAREHOUSES

(75) Inventors: Kevin Paul Kornelson, Redmond, WA (US); Murali Vajjiravel, Sammamish, WA (US); Rajeev Prasad, Kirkland, WA (US); Paul D. Clark, Sammamish, WA (US); Tarek Najm, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 545 days.

(21) Appl. No.: 10/447,897

(22) Filed: May 29, 2003

(51) Int. Cl.
*G06F 17/30* (2006.01)
(52) U.S. Cl. ...................... 707/203; 707/102
(58) Field of Classification Search ............... 707/102, 707/100–104.1, 200–205
See application file for complete search history.

(56) References Cited

U.S. PATENT DOCUMENTS

| 5,926,818 | A | 7/1999 | Malloy |
| 6,122,628 | A | 9/2000 | Castelli et al. |
| 6,871,228 | B1 | 3/2005 | Shah et al. |
| 2002/0070953 | A1 | 6/2002 | Barg et al. |
| 2002/0099563 | A1* | 7/2002 | Adendorff et al. ............. 705/1 |
| 2003/0014335 | A1* | 1/2003 | Lecheler-Moore et al. ... 705/30 |
| 2003/0023413 | A1 | 1/2003 | Srinivasa |

OTHER PUBLICATIONS

Larson, Diane, Data Transformation Services (DTS) in SQL Server 2000, Sep. 2000.*
Beauchemin, Bob, The XML Files: Investigate the diffrences between SQL Server 2000's XML integration and Microsoft's XML technology preview, 2000, SQL Server Magizine.*
Vassiliadis, et al., "Conceptual Modeling for ETL Processes," Proceedings of the 5th ACM International Workshop on Data Warehousing and OLAP, 2002, pp. 14-21, ACM Press, New York, U.S.A.
Loshin, David, "Rule-Based Data Quality," Proceedings of the 11th International Conference on Information and Knowledge Management, 2002, pp. 614-616, ACM Press, New York, U.S.A.
Pietriga, et al., "VXT: A Visual Approach to XML Transformations," Proceedings of the 2001 ACM Symposium on Document Engineering, 2001, pp. 1-10, ACM Press, New York, U.S.A.
Pokorny, Jaroslav, "Modelling Stars Using XML," Proceedings of the 4th ACM International Workshop on Data Warehousing and OLAP, 2001, pp. 24-31, ACM Press, New York, U.S.A.
Golfarelli, et al., "Data Warehouse Design from XML Sources," Proceedings of the 4th ACM International Workshop on Data Warehousing and OLAP, 2001, pp. 40-47, ACM Press, New York, U.S.A.

(Continued)

*Primary Examiner*—Mohammad Ali
(74) *Attorney, Agent, or Firm*—Senniger Powers

(57) ABSTRACT

Developing an ETL system for transforming data prior to loading the data into a data warehouse. An embodiment of the invention automatically generates configuration files from an input data flow diagram defining the ETL system. The configuration files or other metafiles control execution of the processes illustrated in the data flow diagram. The invention includes a notation for use in the data flow diagram.

33 Claims, 12 Drawing Sheets

OTHER PUBLICATIONS

Vaduva, et al., "M$^4$—A Metamodel for Data Preprocessing," Proceedings of the 4th ACM International Workshop on Data Warehousing and OLAP, 2001, pp. 85-92, ACM Press, New York, U.S.A.

Hahn, et al., "Automatically Generating OLAP Schemata from Conceptual Graphical Models," Proceedings of the 3rd ACM International Workshop on Data Warehousing and OLAP, 2000, pp. 9-16, ACM Press, New York, U.S.A.

Golfarelli, et al., "A Methodological Framework for Data Warehouse Design," Proceedings of the 1st ACM International Workshop on Data Warehousing and OLAP, 1998, pp. 3-9, ACM Press, New York, U.S.A.

Chaudhuri, et al., "An Overview of Data Warehousing and OLAP Technology," ACM SIGMOD Record, vol. 26, Issue 1, Mar. 1997, pp. 65-74, ACM Press, New York, U.S.A.

* cited by examiner

METHOD AND SYSTEM FOR DEVELOPING EXTRACT TRANSFORM LOAD SYSTEMS FOR DATA WAREHOUSES

TECHNICAL FIELD

The present invention relates to the field of data warehousing. In particular, this invention relates to developing complex extract transform load (ETL) systems for data warehouses.

BACKGROUND OF THE INVENTION

A data warehouse is a database designed to support decision-making in an organization. A typical data warehouse is batch updated on a periodic basis and contains an enormous amount of data. For example, large retail organizations may store one hundred gigabytes or more of transaction history in a data warehouse. The data in a data warehouse is typically historical and static and may also contain numerous summaries. It is structured to support a variety of analyses, including elaborate queries on large amounts of data that can require extensive searching.

The data warehouse often represents data as a "cube" of three, four, or more dimensions. For example, a business may be modeled as a cube having three dimensions, corresponding to real-world business distinctions such as Product, Time, and Market. Any point within the cube is at the intersection of the coordinates defined by the edges of the cube, and is viewed as corresponding to a metric or measurement that is valid for the combination of dimension values that define the point. For example, such metrics might include "units sold," "price," etc. Each point may indicate the price and units sold of a particular product, at a particular time or time period, in a given market.

Some systems implement this data model from within a relational database. A relational database has many interrelating tables. As known in the art, each table typically has a two dimensional structure of values with records and fields. A table can have a combination of one or more fields called the primary key. This means that for each record, the values in the fields of the primary key serve to identify the record. These values in fields of the primary key are known as primary key identifier (PKID). A given PKID should be unique in a table; that is, no two records should have the same PKID.

Tables in a relational database are related by means of foreign keys. A foreign key is a combination of one or more fields. Each foreign key relates to a primary key of another table. A record in a table with a foreign key relates to a record in a table with a primary key if the fields in the foreign key have the same values as the fields in the primary key.

Those skilled in the art are also familiar with dimension tables. A dimension table is a collection of information describing a business construct. For example, in a model designed to represent web usage, there is a "Domain" dimension table including information in the form of strings that describe each target domain, such as the site the domain belongs to and the country code for the domain. Other dimension tables contain information describing concepts such as "Time," "Referring Domain," and many others. Note that dimensions are usually parameters relating to the organization of measured data, and do not indicate the measured data itself.

Other tables include fact tables which contain the actual numeric metrics, such as a count of page views, that a user might be interested in viewing. In addition, there are defined relationships between the dimension and fact tables. Specifically, the fact table has a plurality of foreign keys which relate to primary keys in the dimension tables. This allows the individual records of the fact table to be indexed or matched up to specific dimensional values. That is, given a set of dimensional values, corresponding metrics can be located. In the example above, a user wishes to view data from the page views fact table. The Domain dimension table allows the user to choose a single domain, and then see only the data from the page views fact table that corresponds to that target domain. Similarly, the time dimension allows the user to choose a single day and view only the data from the page views fact table that corresponds to the chosen target domain and the chosen date. Choosing the dimensions across which a user wants data to be summarized is sometimes referred to as slicing the data. A definition of the relationship between tables in a data warehouse is called a schema.

Most metrics are aggregates that summarize data across criteria provided by one or more dimension tables in the data warehouse. In the example above, the count of page views is aggregated across a specific target domain (from the Domain table) and a specific day (from the Time table). This particular metric provides a count of a given value. Other metrics might provide a sum, average, or other summary. Still other metrics are calculated, rather than aggregated. For example, a data warehouse might provide metrics such as Peak Hour Page Views, which provides the hour during which the most page views are received. This metric is not derived by summarizing a value across dimensions; instead, it is calculated by comparing a value across dimensions and selecting the top value. Other calculated metrics might provide the bottom value, the top or bottom N values, the top or bottom percentage, etc.

Those skilled in the art are familiar with data modeling such as this (see Kimball, Ralph, *The Data Warehouse Lifecycle Toolkit*, Wiley 1998).

After the tables of a data warehouse have been populated with actual data, the warehouse becomes very useful. However, the process of populating the data warehouse can become quite difficult because of the enormous amounts of data involved. Consider, as an example, the task of populating a web usage data warehouse in a company that maintains numerous web sites administered by different divisions within the company in different parts of the world. Furthermore, each site may have a number of individual servers. For example, the company may maintain more than five hundred servers, which might use different types of server software. Together, the servers may generate over 1.5 billion log records, each representing a page hit. For data warehousing purposes, it is desired to combine data logged by each of these servers and use it to populate a data warehouse.

Some known art systems use "Extract, Transform, and Load" (ETL) methodology to correlate the data prior to loading the data into the data warehouse. Extraction refers to actually obtaining the data from individual data sources such as servers. Unfortunately, this process in itself can be particularly difficult when dealing with the enormous size of the data in a web usage data warehouse or other large database. Transformation indicates processing the data to put it into a more useful form or format. Loading refers to the process of loading the data into the tables of a relational database. Existing systems require a developer to manually generate the configuration files needed to control transformation in an ETL system. As the importance of data warehousing grows, so grows the need to develop and implement customized ETL systems in a short amount of time.

Existing systems include application development tools (e.g., visual compilers) that output a compiled application program. However, such existing tools fail to provide process development functionality (e.g., data handling) such as needed to develop ETL systems. For example, the existing tools fail to automatically generate flow control for controlling the flow of data through multiple application programs and process control for controlling the operation of each of the application programs responsive to an input data flow diagram.

Accordingly, a system for providing process development functionality to develop complex ETL systems is desired to address one or more of these and other disadvantages.

SUMMARY OF THE INVENTION

Embodiments of the present invention include a method of developing an extract/transform/load (ETL) system in which one or more application programs perform a sequence of operations to transform data prior to loading the data into a data warehouse. In an embodiment, the invention receives a data flow diagram having one or more processes and one or more input and output data store formats associated with each of the processes. For each process, the invention parses the input and output data store formats associated with the process to create a step metafile for the process. The invention also generates a description of the data flow for all the processes and stores the generated description in a control metafile.

According to an embodiment, the invention supports the development of data warehouses with minimal or reduced development cost and design time. In particular, the invention includes a set of tools, a process, and a notation for specifying an ETL system that enables the design of the ETL system in a relatively short amount of time (e.g., two weeks).

In accordance with one aspect of the invention, a method develops an ETL system. The ETL system includes a sequence of operations performed by at least one application program. The method includes generating a metafile for use by the application program in the ETL system for controlling the operation of the application program. The generating occurs in accordance with a data flow diagram describing the ETL system. The method also includes generating an installation script for installing the generated metafile and the application program on a computer such that the installed application program executes per the generated metafile to implement the ETL system.

In accordance with another aspect of the invention, one or more computer-readable media have computer-executable components for developing an ETL system. The ETL system includes a sequence of operations performed by one or more application programs. The components include an interface module, a process module, and a flow module. The interface module receives input and output information for one or more of the operations from a data flow diagram describing the ETL system. The interface module further receives flow information for the sequence of operations. The process module generates a step metafile for use by at least one of the application programs in the ETL system. Generating the step metafile occurs in accordance with the data flow diagram describing the ETL system. The generated step metafile corresponds to the operations for which information is received by the interface module. The flow module generates a control metafile for use by at least one of the application programs in the ETL system. Generating the control metafile occurs in accordance with the data flow diagram describing the ETL system received via the interface module. The generated control metafile describes the sequence of operations.

In accordance with still another aspect of the invention, a method develops an ETL system for a data warehouse. The ETL system includes a sequence of operations performed by one or more application programs. The method includes developing an execution sequence for the application programs to transform data prior to loading the data into the data warehouse. The method also includes specifying with a notation the developed execution sequence in a data flow diagram. The method further includes generating a configuration file from the data flow diagram. The configuration file specifies execution of the application programs in the ETL system according to the developed execution sequence.

In accordance with yet another aspect of the invention, one or more computer-readable media have computer-executable components for implementing an ETL system for a data warehouse. The ETL system is described by a data flow diagram. The components include an application program for transforming data prior to loading the data into the data warehouse. The components also include a metafile that defines execution of the application program. The metafile is automatically generated from the data flow diagram. The components also include an installation script for installing the application program and the metafile onto a computer such that the installed application program executes per the generated metafile to implement the ETL system.

In accordance with another aspect of the invention, a system develops an ETL system for a data warehouse. The ETL system includes a sequence of operations performed by one or more application programs. The system includes a means for developing an execution sequence for the application programs to transform data prior to loading the data into the data warehouse. The system also includes a means for specifying with a notation the developed execution sequence in a data flow diagram. The system further includes a means for generating a configuration file from the data flow diagram. The configuration file specifies execution of the application programs in the ETL system according to the developed execution sequence.

Alternatively, the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

In an embodiment, the invention includes a method for developing an extract/transform/load (ETL) system for a data warehouse. In particular, the invention includes developing an execution sequence for one or more application programs to transform data prior to loading the data into the data warehouse. A data flow diagram illustrates the developed execution sequence using a specific notation. The invention interprets the data flow diagram to generate one or more configuration files to control execution of the application programs according to the developed execution sequence.

Exemplary Data Warehouse Embodiment

Figure 1:
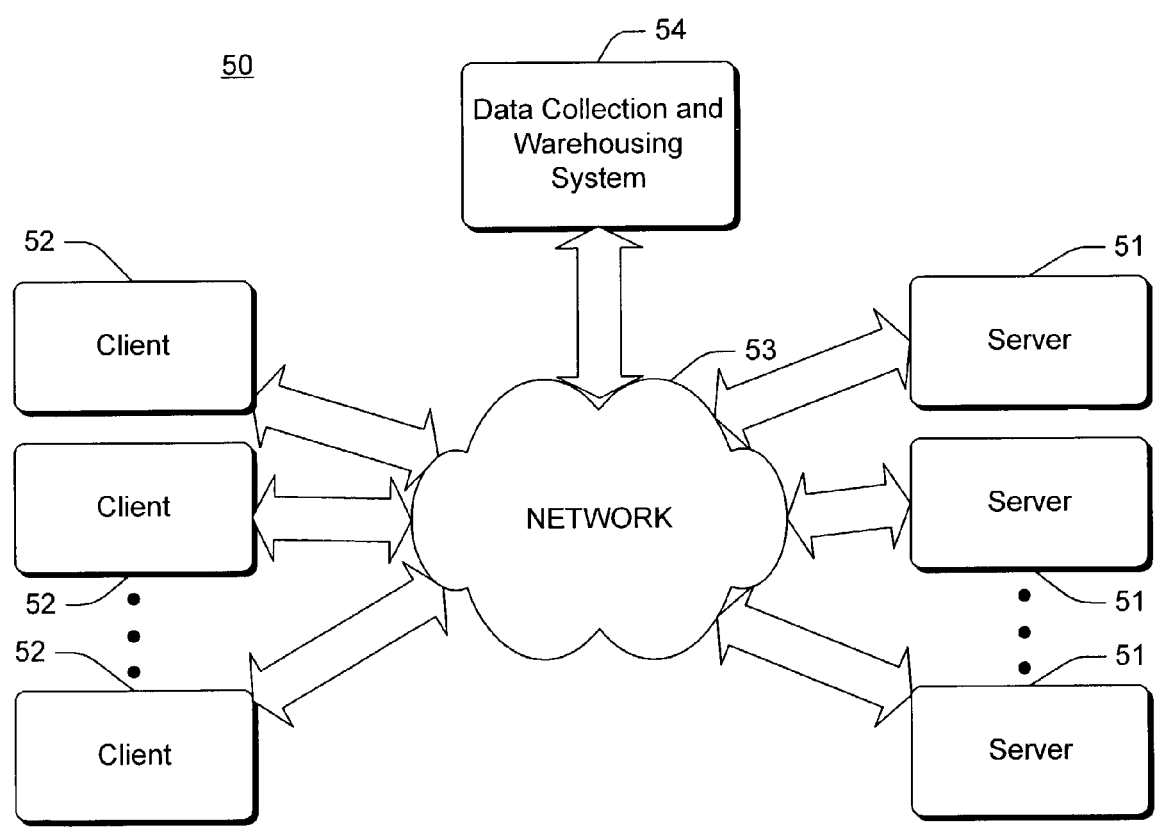
FIG. 1 is an exemplary embodiment of a client/server network system and a data collection and warehousing system.

Referring first to FIG. 1, the invention is operable in an exemplary embodiment of a client/server network system 50 and a data collection and warehousing system 54. FIG. 1 shows the network system 50 comprising a plurality of servers 51 and clients 52. These computers 51, 52 are connected for high-speed data communications over a network 53, using well-known networking technology. The Internet is one example of network 53. Servers 51 accept requests from large numbers of remote network clients 52. The data servers 51 provide responses comprising data that potentially includes graphically formatted information pages. In many cases, the data is in the form of hypertext markup language (HTML) documents. In addition to the servers 51 and clients 52, the system of FIG. 1 includes a central collection facility or data warehousing system 54. The data warehousing system 54 communicates through network 53 with other network nodes such as servers 51 and clients 52, although other means of communication may also be utilized. The data warehousing system 54 is described in more detail below.

Figure 2:
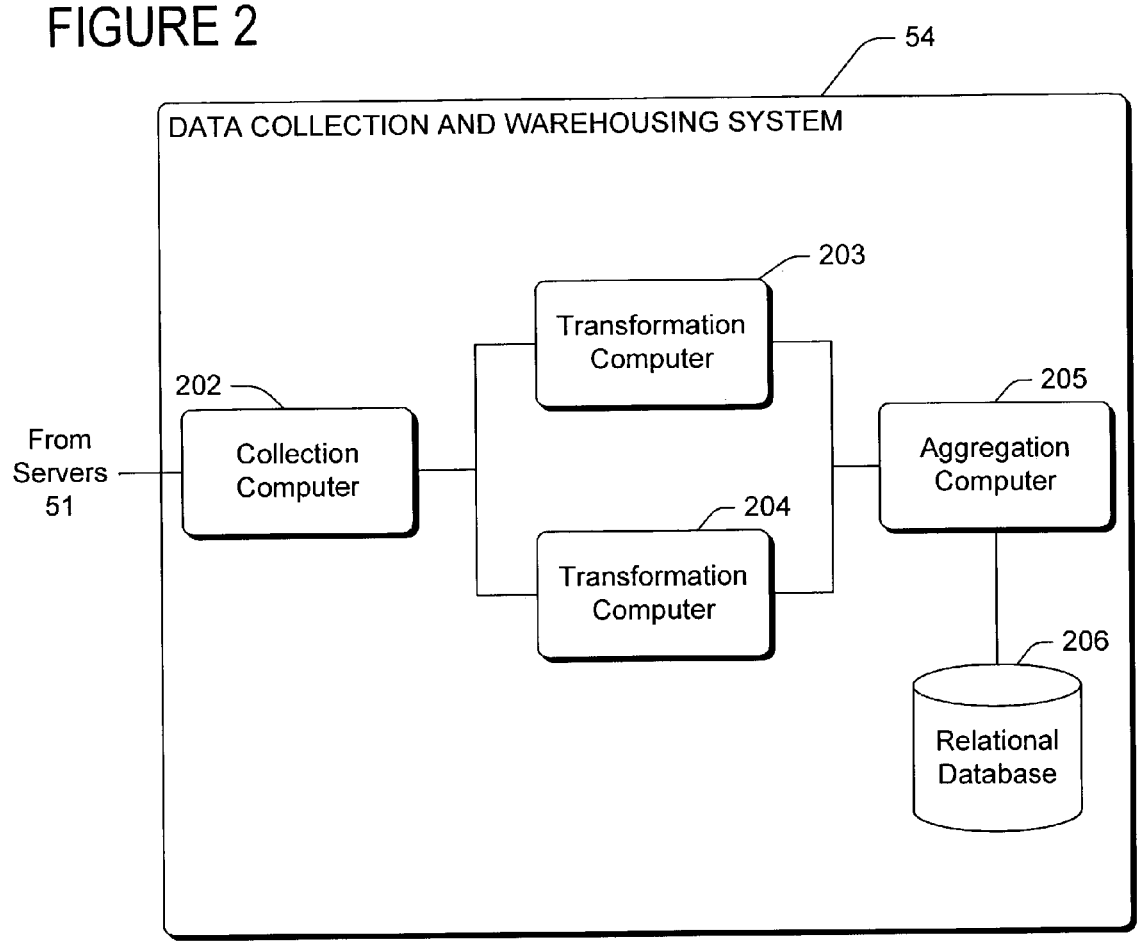
FIG. 2 is a block diagram illustrating an exemplary implementation of a data collection and warehousing system such as the one shown in FIG. 1.

Referring next to FIG. 2, a block diagram illustrates an exemplary implementation of the data collection and warehousing system 54 shown in FIG. 1 using extract/transform/load (ETL) methodology. FIG. 2 shows elements of data collection and warehousing system 54 that is connected for data communications with servers such as network servers 51 (see FIG. 1). Although only a relatively few servers are shown for convenience in FIG. 1, it should be recognized that the invention is intended for use with any number of such servers and corresponding log entries. For example, there may be over five hundred Internet servers located in different parts of the world. Collectively, these servers may generate an enormous number of log entries (e.g., over 1.5 billion) that are processed by the system 54 shown in FIG. 2.

The data warehousing system includes a data collection computer 202, one or more transformation computers such as transformation computers 203, 204, an aggregation computer 205, and a database repository or server such as a relational database 206. Different processing tasks are distributed to the illustrated computers as described below. However, other hardware configurations and other divisions of processing tasks are within the scope of the invention. In some embodiments, a single computer may perform the processes implemented by data collection computer 202, transformation computers 203, 204, and aggregation computer 205. The computers shown in FIG. 2 communicate with each other and with servers 51 through conventional communications channels, including the Internet, local area networks, and/or wide area networks.

The data warehouse may include any form of database repository (e.g., relational or non-relational). However, in one embodiment, the database repository includes relational database 206 as a structured query language (SQL) database which comprises the data warehouse. The tables of the database are related to each other under a schema designed to efficiently represent the targeted data and to allow a user to slice the data for viewing desired statistics. In one embodiment, the database is modeled dimensionally using a schema wherein a central fact table contains a plurality of foreign keys and metrics. The foreign keys allow the metrics to be sliced in various different ways. Specifically, the foreign keys relate the fact table to surrounding dimensions or dimension tables that contain definitions of the various dimensions by which the metrics can be organized or sliced: time, domain, target page, etc. The database contains a plurality of fact tables and associated dimension tables. If a dimension table has foreign keys that relate to other dimension tables, the schema is known to those skilled in the art as a snowflake schema. If no dimension table has foreign keys that relate to other dimension table, the schema is known to those skilled in the art as a star schema. Those skilled in the art are familiar with database schemas and their design.

The components of FIG. 2 implement a method of populating relational database 206 with logged data from a plurality of servers such as servers 51. The invention provides for the development of the method of populating relational database 206. The components form a processing pipeline that receives individual log files from the plurality of servers, on a periodic basis, and passes the received files through a sequence of operations. Exemplary operations may include, but are not limited to, the exemplary operations next described.

System 54 periodically provides a pre-processor component to each of the servers. Each server executes the pre-processor component to pre-process that server's data. Each server compresses the pre-processed log data and sends it to collection computer 202. Those skilled in the art are familiar with log data which may include user information such as web logs, instant messaging logs, newsletter usage statistics, member directory information (e.g., hobbies), and mobile usage statistics. Collection computer 202 decompresses the pre-processed data and provides it to one or more transformation computers such as transformation computers 203, 204. For each pre-processed log file, the transformation computers 203, 204 parse the data to generate (a) a fact file containing one or more foreign key values and metrics for eventual use in the data warehouse (e.g., relational database 206), and (b) a dimension file containing one or more primary key values and strings for eventual use in the data warehouse. In one example, each of the key values is a primary key identifier (PKID) for eventual storage and use by the data warehouse. During this parsing, the transformation computers 203, 204 remove incorrect values and irrelevant records from the fact files and dimension files. This is sometimes referred to by those skilled in the art as cleansing or scrubbing the data. Further, during parsing, the transfor mation computers 203, 204 transformation logic to the scrubbed fact files and dimension files. For example, in the web usage arena, the servers remove records relating to peripheral or non-useful events, such records relating to requests for image data (graphics files such as .gif, .jpeg, and .bmp files).

The fact files are provided to aggregation computer 205, which further parses the files to generate, for each fact file, a plurality of fact tables corresponding to different fact tables of the data warehouse. Each fact table contains one or more foreign key values and associated metrics corresponding to primary key identifiers (IDs) in the data warehouse. The dimension files are also provided to aggregation computer 205, which further parses the files to generate, for each dimension file, a plurality of dimension tables corresponding to different dimension tables of the data warehouse. Each dimension table contains one or more primary key values and dimension strings corresponding to primary key IDs in the data warehouse.

The aggregation computer 205 merges tables corresponding to the same data warehouse table to generate fact and dimension tables that each correspond to a single one of the data warehouse tables. The aggregation computer 205 then loads these fact and dimension tables directly into the corresponding data warehouse tables of the database repository 206. Little or no further processing is required within the relational database 206 structure of the data warehouse.

Figure 3:
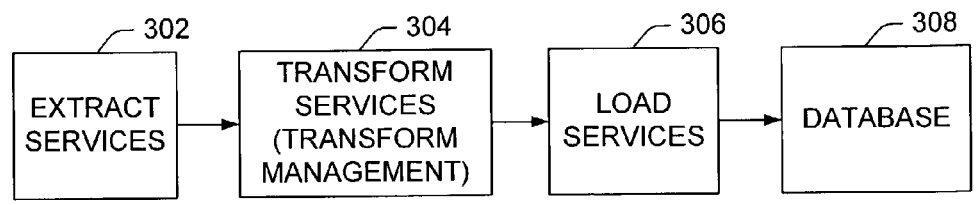
FIG. 3 is an exemplary block diagram illustrating an extract/transform/load (ETL) methodology for populating a data warehouse.

Referring next to FIG. 3, an exemplary block diagram illustrates a template for ETL services for a large-scale data warehouse. Extract services 302 are executed on servers such as server 51 or elsewhere to collect user data. A transformation computer such as transformation computer 203 or 204 provides transform management services 304 to apply transformation logic to the collected data. Load services 306 aggregate the transformed data (e.g., via aggregation computer 205) and load the aggregated data into a database 308 (e.g., database repository 206).

There are at least three types of tools (e.g., application programs) used in the invention to develop an ETL system: step tools, control tools, and configuration generation tools. Those skilled in the art are familiar with step tools and control tools (see Kimball, Ralph, *The Data Warehouse Lifecycle Toolkit*, Wiley 1998, p. 360–366). In general, the step tools provide data transformation services (see Kimball, p. 360–363) while the control tools are used for data staging job control services (see Kimball, p. 364–366). The control tools provide support for monitoring, logging, and error handling. In addition, the control tools control the sequence and concurrency of different instances (i.e., instantiations) of the step tools.

Developing an ETL System

Figure 4:
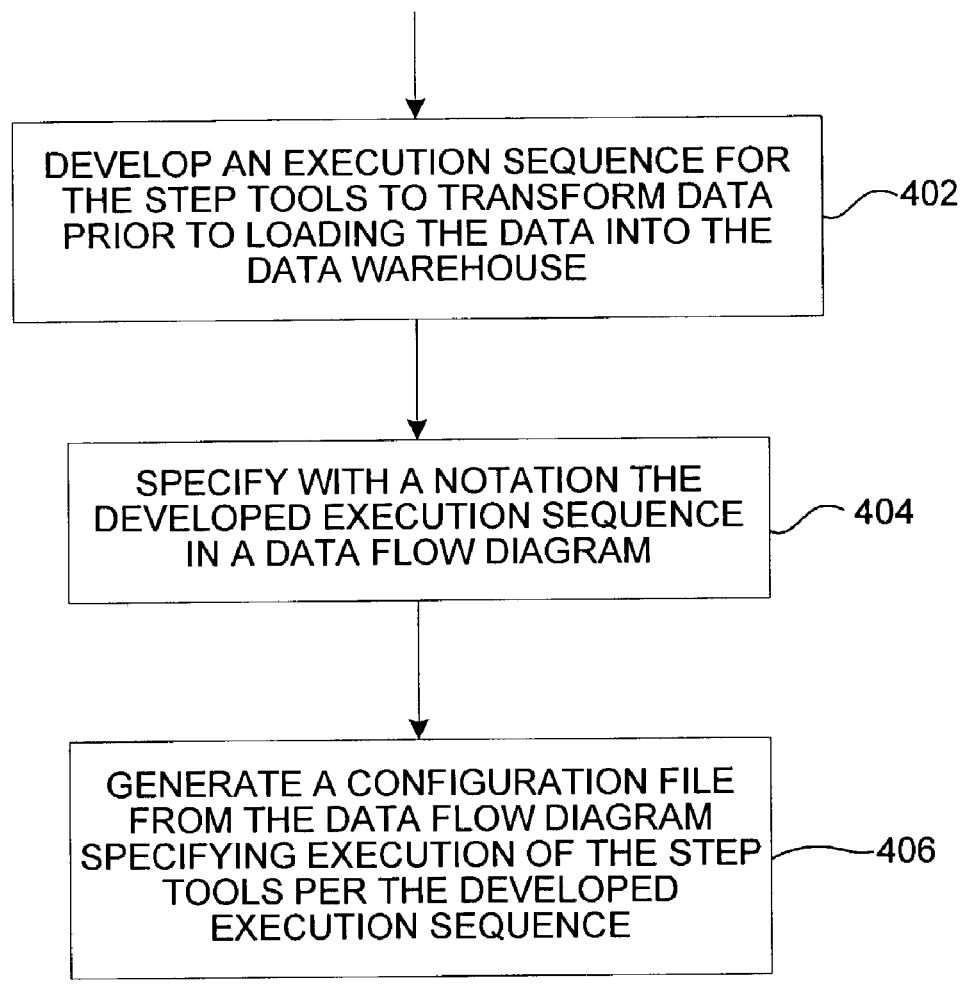
FIG. 4 is an exemplary flow chart illustrating operation of the development of an ETL system.

Referring next to FIG. 4, an exemplary flow chart illustrates operation of the development of an ETL system according to the invention. In general, the invention performs process modeling by receiving a specification of input(s) and output(s) to the system, designing processes or receiving a designed process to take the specified input(s) and create the specified output(s), and automatically translating the designed processes to configuration files for at least one application program such as a step tool.

In particular, an exemplary method for designing an ETL system includes gathering requirements from program management and/or customers about the input to the ETL system and about the reports that the overall data warehouse should produce. Further, the method includes designing and review ing the database schema for the data warehouse. Information from the database schema is the output of the ETL schema. The method includes designing a pipeline (e.g., selecting transformation operations) using the notation described herein to transform the input to the output. That is, the method sequences the step tools at 402 such that the step tools, when executed, transform the data input according to the input format to the report format prior to loading the data into the data warehouse. The invention specifies at 404 the developed execution sequence using notation as described herein in the data flow diagram. The method further includes reviewing the pipeline with program management and database designers (e.g., to ensure that all columns have correct data types, that the files have correct columns, and that the boundary conditions are handled correctly). The method further includes automatically generating the configuration files using the configuration generation tools as described herein at 406. The method also includes reviewing the generated configuration files and unit testing the resulting ETL system.

Existing systems require a developer to manually generate the configuration files. In contrast, configuration generation tools of the invention convert a CASE or VISIO dataflow diagram to an extensible markup language (XML) document which may be converted via extensible stylesheet language transformations (XSLT) to convert the XML document to one or more intermediate metafiles (e.g., other XML documents) to be used by other application programs in the ETL toolset (e.g., step and control tools). Alternatively, the configuration generation tools modify the intermediate metafiles for use by other application programs in the ETL toolset. Those skilled in the art are familiar with XSLT and its capability to transform XML documents into other XML documents.

One or more computer-readable media have computer-executable instructions for performing the methods illustrated in FIG. 4.

Notation in the Data Flow Diagram

The data flow diagram is optimized for use in developing a data warehouse solution. The configuration generation tools use a notation for specifying ETL systems in the data flow diagram. In particular, the notation uses shapes that represent use of step tools and shapes that represent data files. The step tool shapes are known as processes and the data file shapes are known as data stores. The notation specifies that data stores may be connected to each other directly. The shape for a record-based data store shows the complete definition of the record.

The notation used in the data flow diagram specifies that the data stores be located between the processes such that the processes do not have direct connections to each other in the data flow diagram. Each of the processes has zero or more input data stores and zero or more output data stores. The data stores specify the input data format and the output data format for each of the operations in the data flow diagram. Each of the record-based data stores includes a definition for the record associated with the data store in the data flow diagram.

In one embodiment, each process includes one or more of the following: a process name, step name, the job to be performed, and the tool to perform the job. See FIG. 9 for examples of processes.

Configuration Generation

The configuration generation tools are used in the method described herein to convert a data flow diagram given in the notation into configuration files for use by the process step tools and process control tools. The configuration generation tools generate metafiles that describe the execution of the step and control tools.

Figure 5:
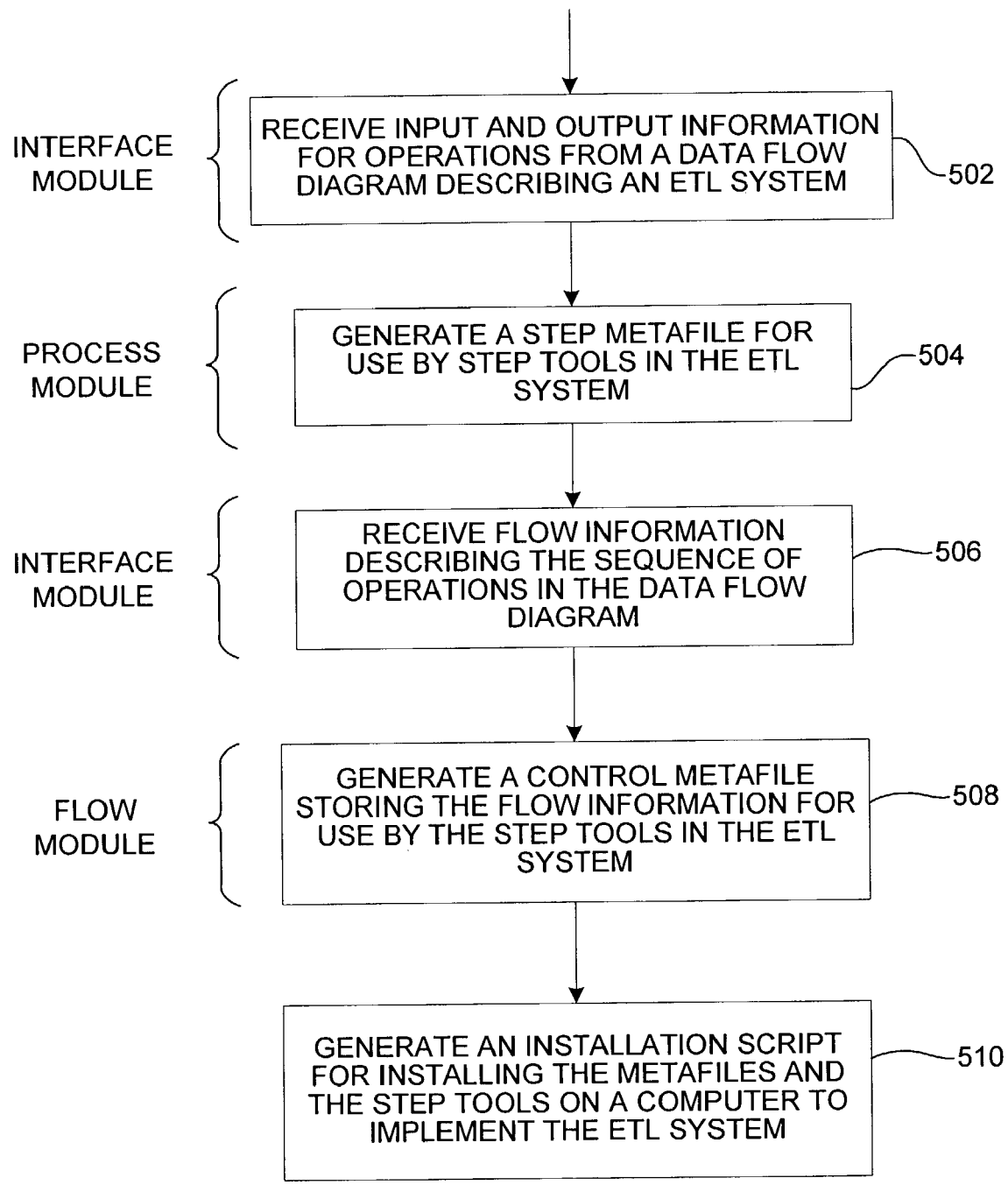
FIG. 5 is an exemplary flow chart illustrating operation of the configuration generation tools of the invention.

Referring next to FIG. 5, an exemplary flow chart illustrates operation of the configuration generation tools of the invention. The invention provides data transformation services that operate on an input data flow diagram. According to one embodiment, the configuration generation tools (e.g., application programs) of the invention convert the data flow diagram to a form (e.g., an extensible markup language document) that is readable by the configuration generation tools. The configuration generation tools further create configuration files or other metafiles for use by an ETL toolset (e.g., step tools) based on the converted data flow diagram. The configuration files control the behavior of the ETL tool set by identifying the inputs and outputs and flow control of each element in the ETL system. In general, the configuration generation tools map each element in the input data flow diagram to a tool in the ETL toolset.

The data flow diagram is optimized for developing data warehousing solutions. It is contemplated by the inventors that the invention will take as input a data flow diagram generated by various design environments known in the art. Further, it is contemplated by the inventors that the invention is operable with any ETL tool set known in the art. In this manner, the configuration generation tools provide standard implementations with minimal cost and error.

A data flow diagram defines an ETL system comprising a sequence of operations or processes performed by at least one application program. In operation, the configuration generation tools receive the data flow diagram having one or more processes and one or more input and input data store formats associated with each of the processes. The configuration generation tools convert the data flow diagram to an extensible markup language document for parsing by other configuration tools. For each process, the configuration generation tools parse input and output data store formats associated with the process to create a step metafile for the process. The configuration generation tools also generate a description of the data flow for the processes and store the generated description in a control metafile.

In one embodiment, an interface module of the configuration generation tools receives input and output information for one or more of the operations from a data flow diagram describing the ETL system at 502. A process module in the configuration generation tools generates a step metafile for use by at least one of the application programs in the ETL system at 504. Generating occurs in accordance with the data flow diagram describing the ETL system. The generated step metafile corresponds to the operations for which information is received by the interface module and stores the received input and output information.

The interface module of the configuration generation tools also receives flow information for the sequence of operations at 506. A flow module generates a control metafile for use by at least one of the application programs in the ETL system at 508. Generating the control metafile includes mapping each of the operations in the data flow diagram to at least one of the application programs. The generated control metafile describes the sequence of operations and stores the flow information received by the interface module.

The configuration generation tools further generate an installation script at 510 to install the generated metafiles and the application programs on a computer such that the installed application programs execute per the generated metafiles to implement the ETL system.

In one form, the received input information includes one or more of the following: a title for an input file, a type for the input file, a path of the input file, a list of columns, a data type, a data size, and a data attribute.

One or more computer-readable media have computer-executable instructions for performing the methods illustrated in FIG. 5.

Exemplary Operating Environment

Figure 6:
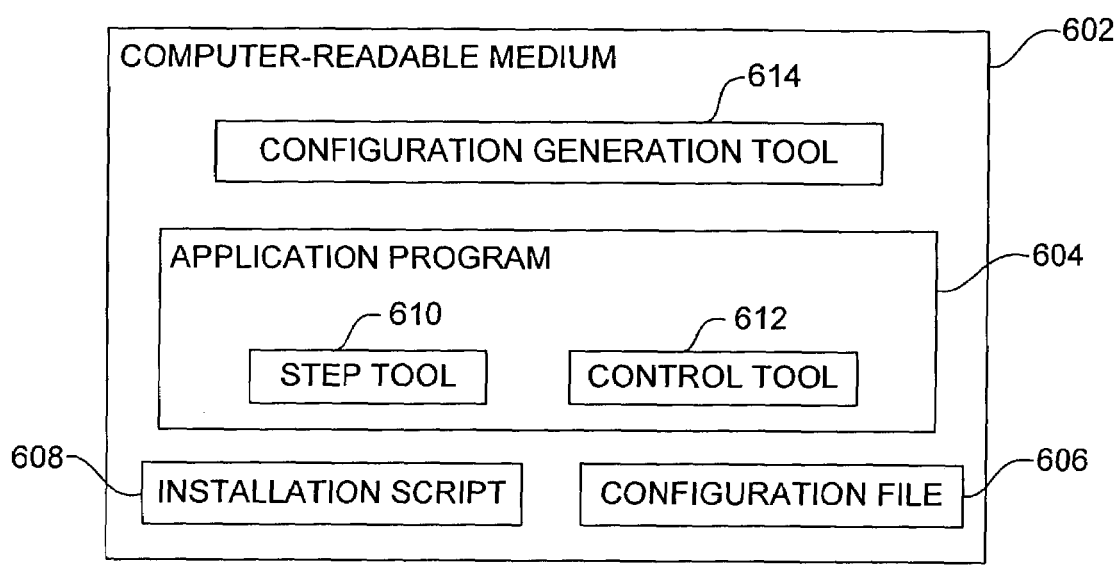
FIG. 6 illustrates an exemplary computer-readable medium on which the invention may be stored.

Referring next to FIG. 6, a block diagram illustrates an exemplary computer-readable medium 602 on which the invention may be stored. While only one medium 602 is illustrated in FIG. 6 for convenience, those skilled in the art will note that the invention may be stored on one or more computer-readable media having computer-executable components for implementing an ETL system for a data warehouse. The medium 602 stores an application program 604, a configuration file 606, and an installation script 608. The application program 604 transforms data prior to loading the data into the data warehouse. The configuration file 606 defines execution of the application program 604. The configuration file 606 is automatically generated from the data flow diagram. When executed, the installation script 608 installs the application program 604 and the configuration file 606 onto a computer such that the installed application program 604 executes per the generated configuration file 606 to implement the ETL system.

The application program includes a plurality of step programs such as step tool 610 and at least one control program such as control tool 612. In one embodiment, the step tool 610 includes one or more of the following: a record-by-record transformation program, a program for calculating additive aggregates, a program for calculating nonadditive aggregates, and a fast sorting program. The record-by-record transformation program stores information from a first record to a second record. The control tool 612 includes one or more of the following: a pre-aggregation program for executing the step tools 610 on a file-by-file basis, a cascade program for executing the step tools 610 in parallel, and a stream program for executing the step tools 610 serially.

Further, a computer-readable medium such as medium 602 stores a configuration generation program such as configuration generation tool 614 to automatically generate the configuration file 606 from an input data flow diagram. It is contemplated by the inventors that the configuration generation tool 614 may be stored on another medium (not shown) that is not delivered to a customer. In one embodiment, the configuration generation tool 614 includes one or more of the following: a program for generating a step metafile from the data flow diagram for use by the step tools 610 and a program for generating a control metafile from the data flow diagram for use by the control tool 612.

Figure 7:
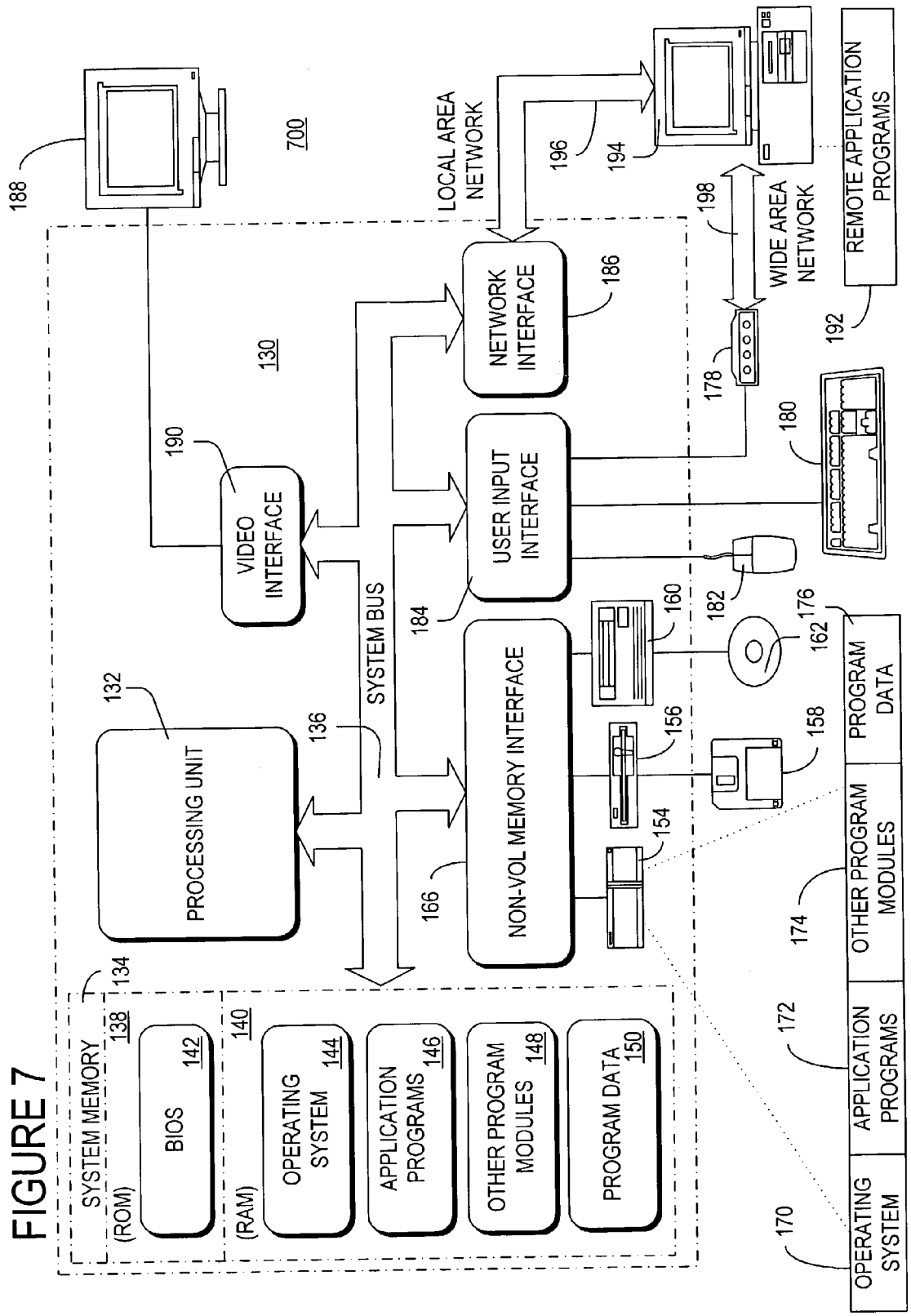
FIG. 7 is a block diagram illustrating one example of a suitable computing system environment in which the invention may be implemented.

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 7 include a local area network (LAN) 196 and a wide area network (WAN) 198, but may also include other networks. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 4 and FIG. 5 to develop an ETL system to transform data prior to loading the data in a data warehouse.

Exemplary ETL Toolset

The following examples further illustrate the invention. An exemplary set of step tools includes one or more of LineXfmer, LineSifter, TeraSum, TeraCount, and the third party product SYNCSORT. LineXfmer is a record-by-record transformation tool. LineSifter is a record-by-record transformation tool with enhancements to be able to carry information from one record to the next. TeraSum is a tool for calculating additive aggregates. TeraCount is a tool for calculating nonadditive aggregates. SYNCSORT is a fast sorting program from Syncsort Incorporated of Woodcliff Lake, N.J. With these five step tools, any ETL system according to the invention may be created with a minimum of custom programming.

An exemplary set of control tools includes one or more of PreAggRunner, CascadeRunner, and StreamRunner. PreAggRunner directs the execution of the ETL step tools in sequence on a per-file basis. CascadeRunner directs the execution of the ETL step tools in parallel (e.g., operates on an entire set of data). StreamRunner directs the execution of the ETL step tools serially.

An exemplary set of configuration generation tools for design, development, and debugging of the ETL system includes one or more of DefnFileGenerator, TeraBuilder, and XfmBuilder. DefnFileGenerator manages the creation of metafiles for PreAggRunner, StreamRunner, CascadeRunner, and SYNCSORT. TeraBuilder manages the creation of metafiles for TeraSum and TeraCount. XfmBuilder manages the creation of metafiles for LineSifter and LineXfmer. Further, the suite of XSLT tools known in the art are also used to transform XML documents.

Figure 8A:
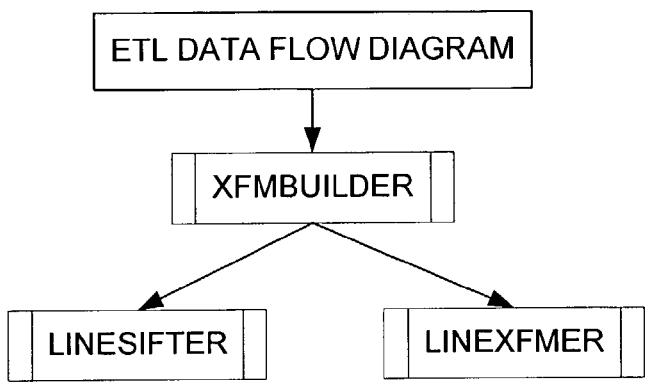
FIGS. 8A–8C are exemplary flow charts illustrating generation of the metafiles for an ETL toolset.
Figure 8B:
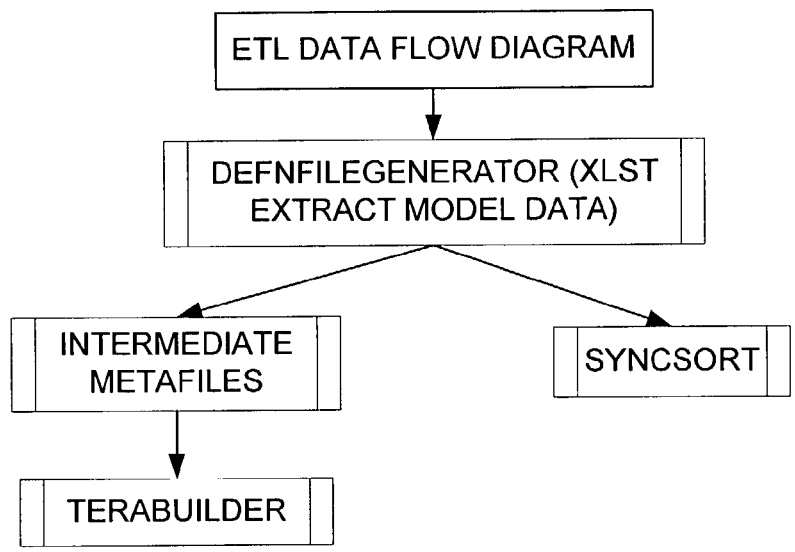
Figure 8C:
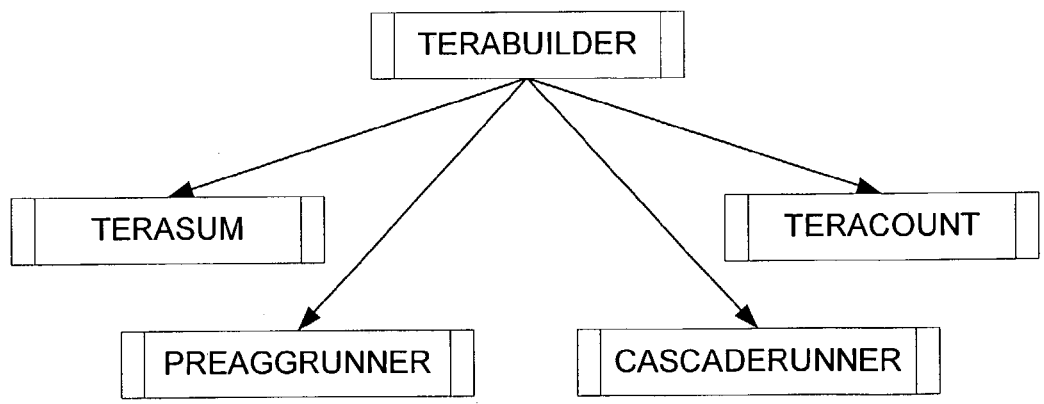
Figure 9A:
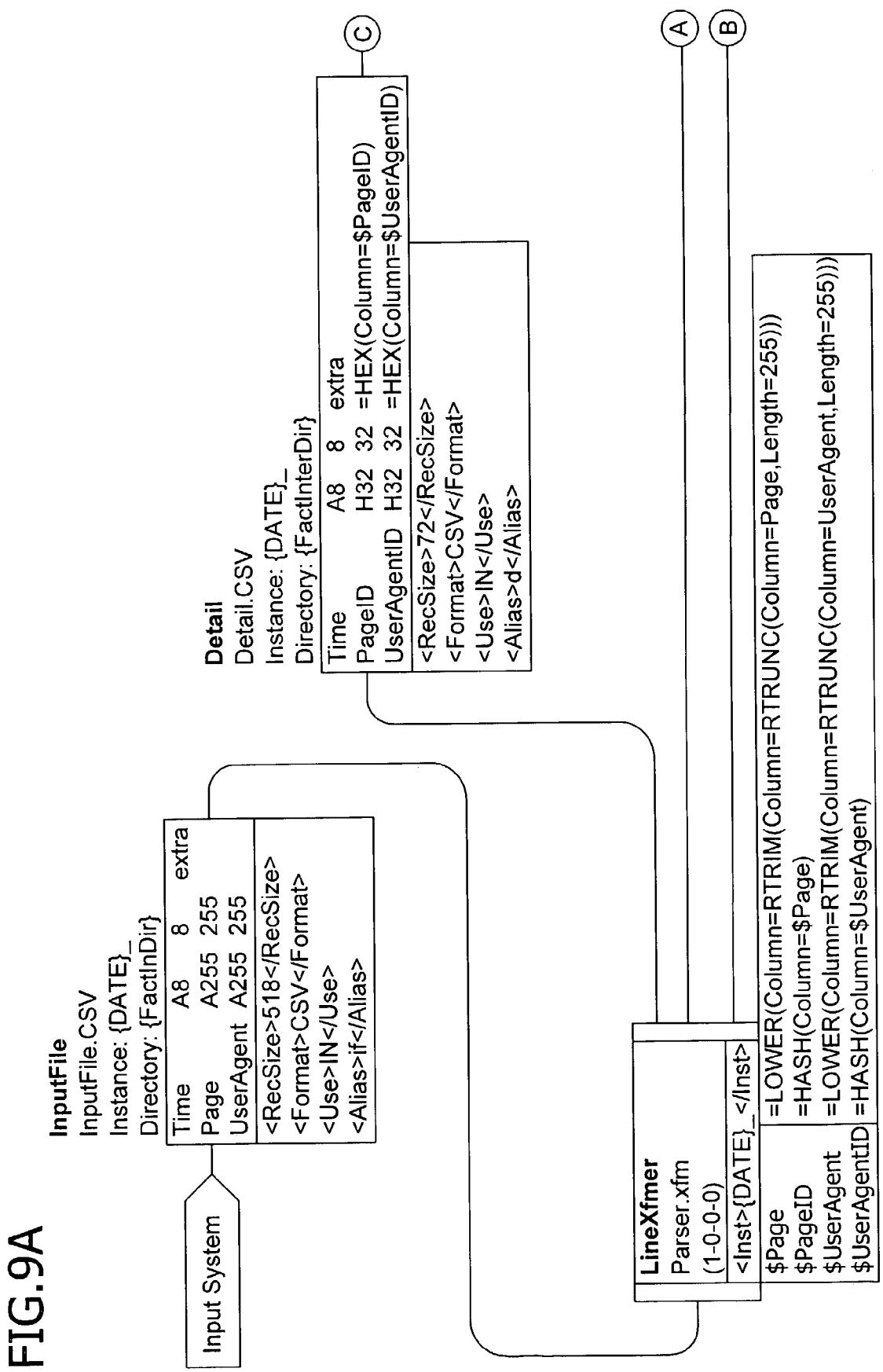
FIGS. 9A–9E are data flow diagrams illustrating an exemplary ETL system developed according to the invention.
Figure 9B:
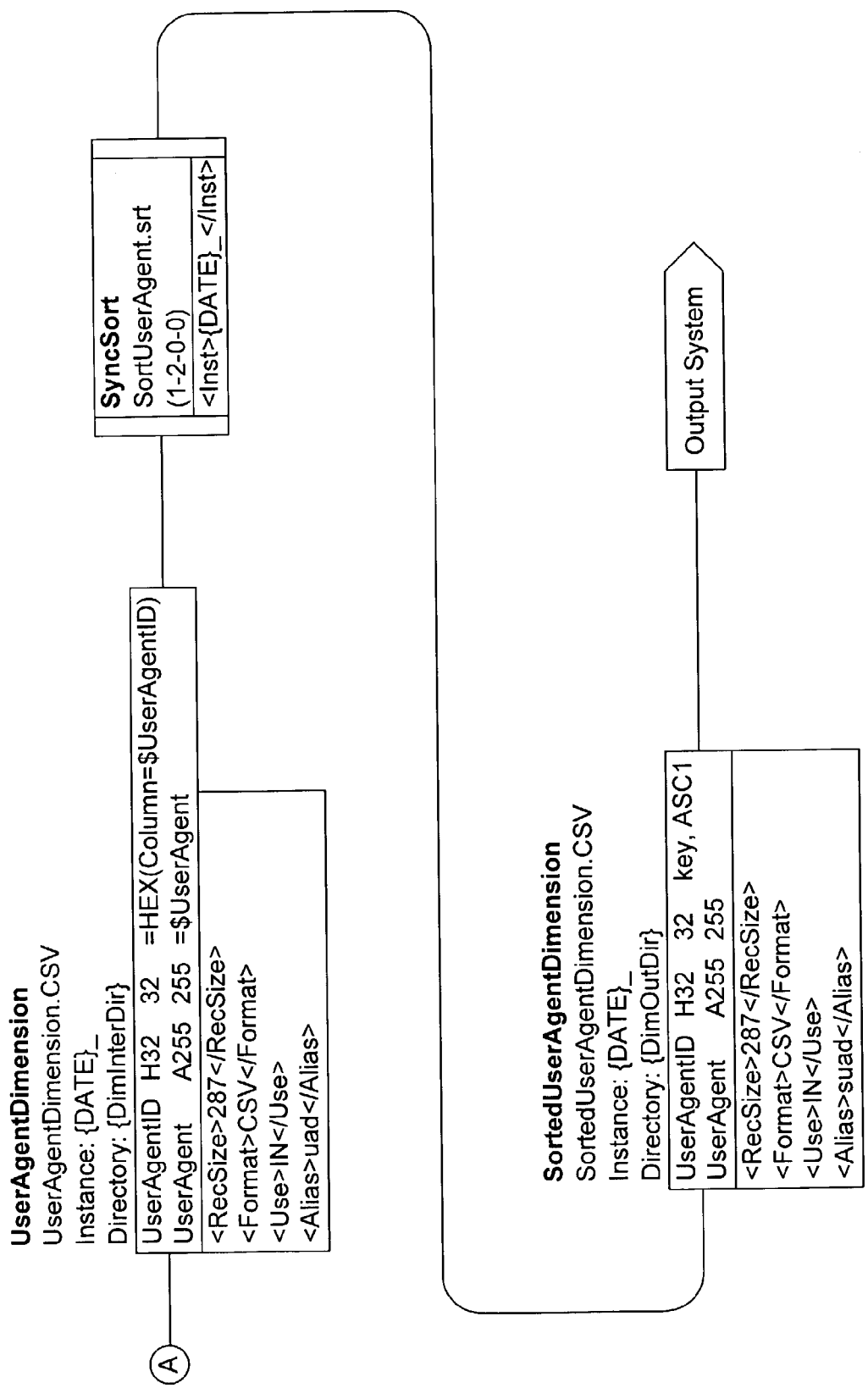
Figure 9C:
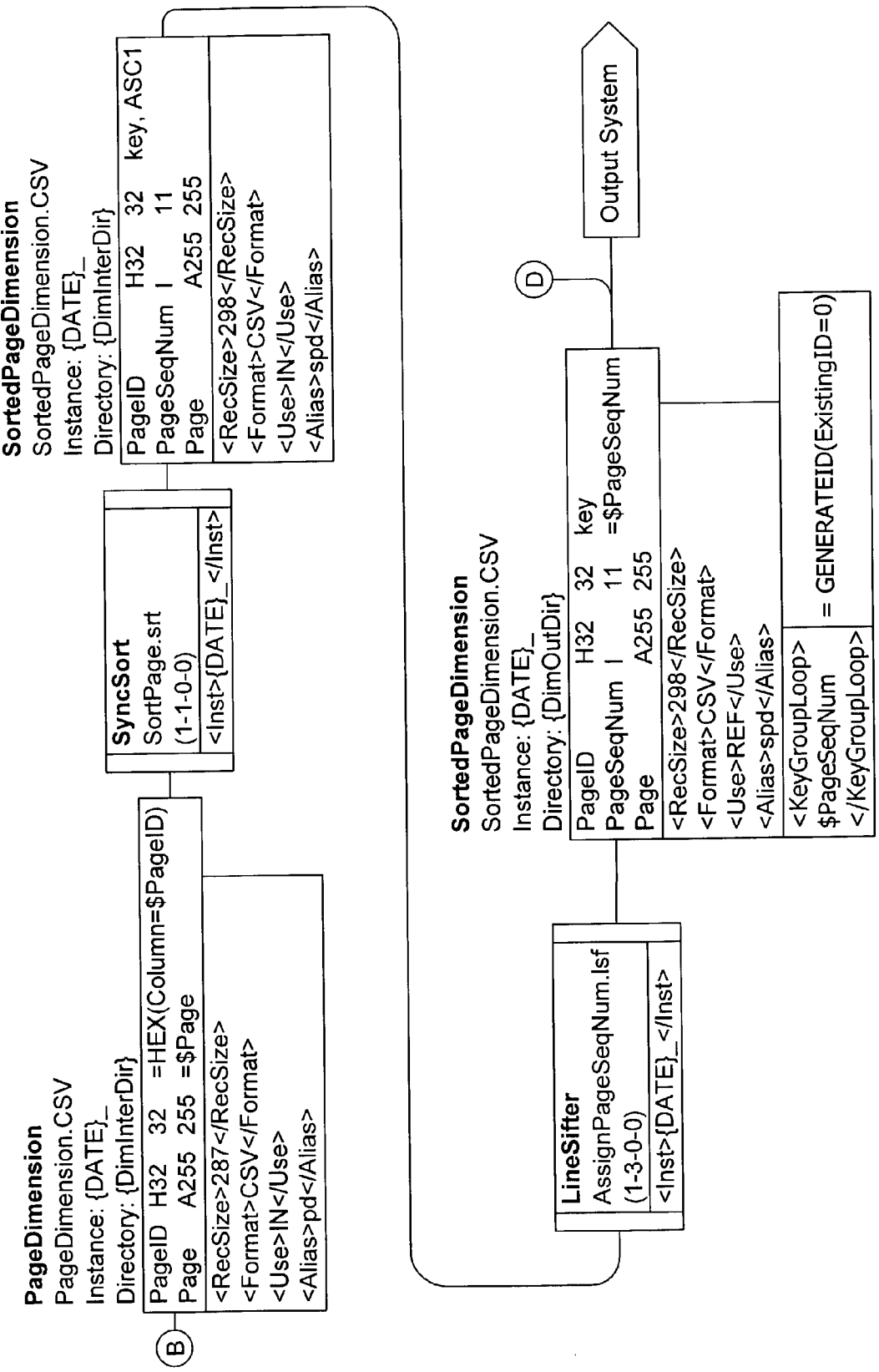
Figure 9D:
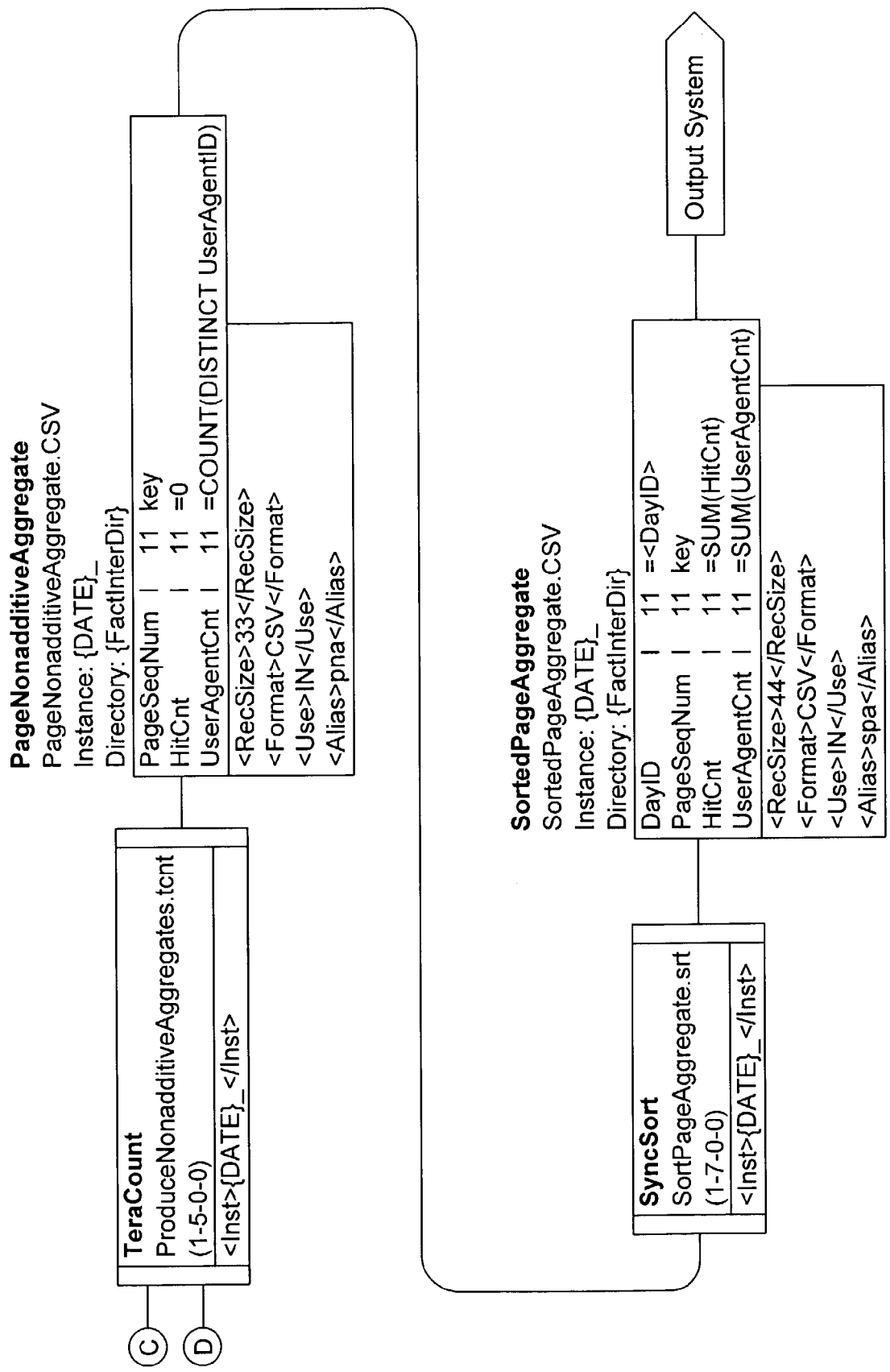
Figure 9E:
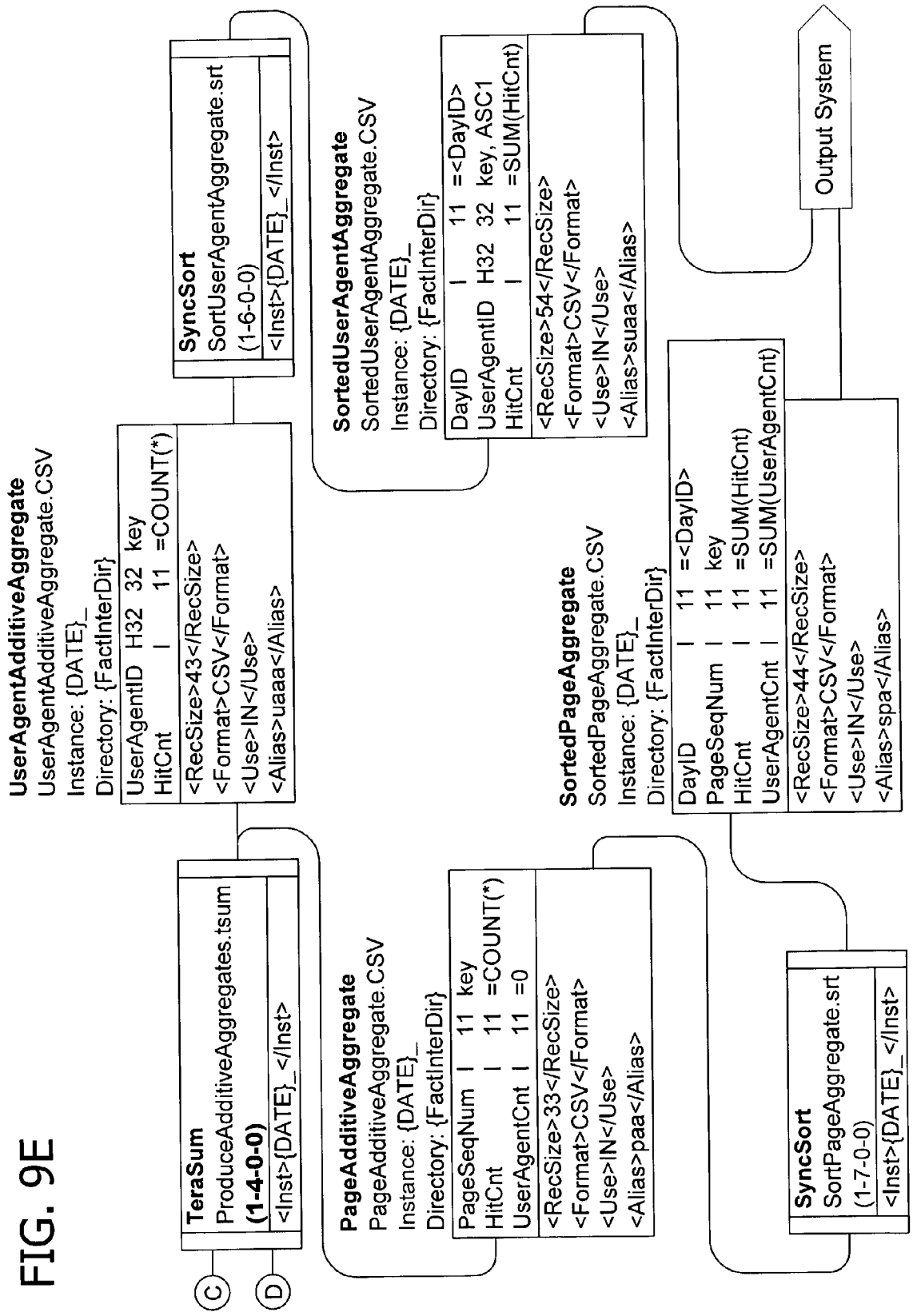

Referring next to FIGS. 8A–8C, exemplary flow charts illustrate generation of the metafiles for an exemplary ETL toolset. In FIG. 8A, the application program XFMBuilder parses an XML file derived from a data flow diagram to generate metafiles to control execution of the application programs LineXfmer and LineSifter in accordance with the data flow diagram. In FIG. 8B, the application program DefnFileGenerator produces metafiles to control execution of the SYNCSORT and TeraBuilder application programs. In FIG. 8C, TeraBuilder builds metafiles for use during execution of TeraSum, TeraCount, PreAggRunner, and CascadeRunner.

In general, the metafiles for PreAggRunner and CascadeRunner specify the execution sequence of the operations via the application program StreamRunner to provide overall control of the system. The StreamRunner application program instantiates the metafiles. In addition, the metafiles for the TeraSum, TeraCount, SYNCSORT, LineXfmer, and LineSifter application programs provide detailed control for each of these application programs.

The system of the invention includes means for developing an execution sequence for the application programs to transform data prior to loading the data into the data warehouse, means for specifying with a notation the developed execution sequence in a data flow diagram, means for generating a configuration file from the data flow diagram, said configuration file specifying execution of the application programs in the ETL system according to the developed execution sequence, means for generating an installation script for installing the generated metafile and the application program on a computer such that the installed application program executes per the generated metafile to implement the ETL system, and means for transforming the data via a sequence of operations.

The methods described herein constitute the means for developing the execution sequence. The notation described herein constitutes the means for specifying the developed execution sequence. The configuration generation tools described herein constitute means for generating the configuration file(s) from the data flow diagram and the means for generating the installation script. The step and control tools described herein constitute the means for transforming the data.

Referring next to FIGS. 9A–9E, a block diagram illustrates an exemplary data flow diagram for use with the invention. The data flow diagram includes operations performed by application programs such as LineXfmer and LineSifter and data stores such as UserAgentDimension and SortedUserAgentDimension. For example, all or a portion of web usage data received from each site may be sorted by user or by time interval using transformations as described herein prior to loading into the data warehouse. The configuration generation tools of the invention generate configuration files for controlling the execution of the application programs. For example, a control configuration file may take the following form.

Cascade Start
  Stream Start
    Step 1
    Input filename
    Output filename
    Step 2
    . . .
  Stream End
Cascade End See Appendix A for exemplary metafiles associated with the ETL system of FIG. 9.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A method of developing an extract/transform/load (ETL) system, said ETL system comprising a sequence of operations performed by at least one application program, said method comprising:
  generating a metafile for use by the application program in the ETL system for controlling the operation of the application program, said generating occurring in accordance with a data flow diagram describing the ETL system, said generating comprising:
    receiving an input format representative of an input to the ETL system;
    receiving a report format representative of a report for a data warehouse to produce from data input according to the input format and stored in the data warehouse; and
    sequencing the at least one application program such that the application program, when executed, transforms the data input according to the input format to the report format prior to loading the data into the data warehouse; and
  generating an installation script for installing the generated metafile and the application program on a computer such that the installed application program executes per the generated metafile to implement the ETL system.

2. The method of claim 1, wherein the generated metafile corresponds to one or more of the operations, and wherein generating the metafile comprises:
  obtaining input and output information for said one of the operations from the data flow diagram; and
  storing the obtained information in the metafile.

3. The method of claim 2, wherein a data store represents the input or output Information.

4. The method of claim 2, wherein the generated metafile defines the sequence of operations, and wherein generating the metafile comprises:
  obtaining flow information for the sequence of operations; and
  storing the obtained flow information in the metafile.

5. The method of claim 1, wherein the data flow diagram is optimized for use in developing a data warehouse solution.

6. The method of claim 5, wherein the operations in the data flow diagram are separated by a data store representing input or output information.

7. The method of claim 1, wherein one or more computer-readable storage media have computer-executable instructions for performing the method of claim 1.

8. One or more computer-readable storage media having computer-executable components for developing an extract/transform/load (ETL) system, said ETL system comprising a sequence of operations performed by one or more application programs, said components comprising:
  an interface module for receiving input and output information for one or more of the operations from a data flow diagram describing the ETL system, said interface module further receiving flow information for the sequence of operations;
  a process module for generating a step metafile for use by at least one of the application programs in the ETL system, said generating occurring in accordance with the data flow diagram describing the ETL system, said generated step metafile corresponding to the operations for which information is received by the interface module; and
  a flow module for generating a control metafile for use by at least one of the application programs in the ETL system, said generating a control metafile occurring in accordance with the data flow diagram describing the ETL system received via the interface module, said generated control metafile describing the sequence of operations, said generating comprising:
    receiving an input format representative of an input to the ETL system;
    receiving a report format representative of a report for a data warehouse to produce from data input according to the input format and stored in the data warehouse; and
    sequencing the application programs such that the application programs, when executed, transform the data input according to the input format to the report format prior to loading the data into the data warehouse.

9. The computer-readable storage media of claim 8, wherein the process module stores the received input and output information in the step metafile.

10. The computer-readable storage media of claim 8, wherein the flow module stores the received flow information in the control metafile.

11. The computer-readable storage media of claim 8, further comprising a component for generating an installation script for installing the generated metafiles and the one or more application programs on a computer such that the installed application programs execute per the generated metafiles to implement the ETL system.

12. The computer-readable storage media of claim 8, wherein the interface module converts the data flow diagram to an extensible markup language document for parsing.

13. The computer-readable storage media of claim 8, wherein the flow module maps each of the operations in the data flow diagram to at least one of the application programs.

14. The computer-readable storage media of claim 8, wherein the received input Information comprises one or more of the following: a title for an input file, a type for the input file, a path of the input file, a list of columns, a data type, a data size, and a data attribute.

15. A method for developing an extract/transform/load (ETL) system for a data warehouse, said ETL system comprising a sequence of operations performed by one or more application programs, said method comprising:
   developing an execution sequence for the application programs to transform data prior to loading the data into the data warehouse, said developing comprising:
      receiving an input format representative of an input to the ETL system;
      receiving a report format representative of a report for the data warehouse to produce from data input according to the input format and stored in the data warehouse; and
      sequencing the application programs such that the application programs, when executed, transform the data input according to the input format to the report format prior to loading the data into the data warehouse;
   specifying with a notation the developed execution sequence in a data flow diagram; and
   generating a configuration file from the data flow diagram, said configuration file specifying execution of the application programs in the ETL system according to the developed execution sequence.

16. The method of claim 15, wherein the data flow diagram includes the operations and further comprises one or more data formats, and wherein the notation specifies that the data formats are located between the operations such that the operations lack direct connections to each other in the data flow diagram.

17. The method of claim 15, wherein the data flow diagram includes the operations, wherein each of the operations has an input data format and an output data format and wherein the notation specifies the input data format and the output data format for each of the operations in the data flow diagram.

18. The method of claim 15, wherein the data flow diagram includes the operations and further comprises record-based data formats, and wherein each of the data formats includes a definition for the record associated with the data format in the data flow diagram.

19. The method of claim 15, wherein developing the execution sequence further comprises testing the ETL system defined by the generated configuration file.

20. The method of claim 15, wherein one or more computer-readable storage media have computer-executable instructions for performing the method of claim 15.

21. The method of claim 15, wherein developing the execution sequence further comprises designing a database schema for the data warehouse.

22. The method of claim 15, wherein developing the execution sequence further comprises reviewing the sequence of application programs with a customer.

23. The method of claim 15, wherein the input format defines a plurality of columns in a table.

24. The method of claim 15, wherein the output format defines a plurality of columns in a table.

25. One or more computer-readable storage media having computer-executable components for implementing an extract/transform/load (ETL) system for a data warehouse, said ETL system being described by a data flow diagram, said components comprising:
   an application program for transforming data prior to loading the data into the data warehouse;
   a metafile defining execution of the application program, said metafile being automatically generated from the data flow diagram and from a report format representative of a report for the data warehouse to produce from data input according to an input format and stored in the data warehouse such that the application program, when executed, transforms the data input according to the input format to the report format prior to loading the data into the data warehouse; and
   an installation script for installing the application program and the metafile onto a computer such that the installed application program executes per the generated metafile to implement the ETL system.

26. The computer-readable storage media of claim 25, wherein the application program comprises a plurality of step programs and a control program, and wherein the control program comprises one or more of the following: a pre-aggregation program for executing the step programs on a record-by-record basis, a cascade program for executing the step programs in parallel, and a stream program for executing the step programs serially.

27. The computer-readable storage media of claim 25, wherein the application program comprises one or more of a step program and a control program.

28. The computer-readable storage media of claim 27, wherein the step program comprises one or more of the following: a record-by-record transformation program, a program for calculating additive aggregates, a program for calculating nonadditive aggregates, and a fast sorting program.

29. The computer-readable storage media of claim 27, wherein the record-by-record transformation program stores information from a first record to a second record.

30. The computer-readable storage media of claim 27, further comprising a configuration generation program including one or more of the following: a program for generating the metafile from the data flow diagram for use by the step program and a program for generating the metafile from the data flow diagram for use by the control program.

31. A system for developing an extract/transform/load (ETL) system for a data warehouse, said ETL system comprising a sequence of operations performed by one or more application programs, said system comprising:
   means for developing an execution sequence for the application programs to transform data prior to loading the data into the data warehouse;
   means for specifying with a notation the developed execution sequence in a data flow diagram; and
   means for generating a configuration file from the data flow diagram, said configuration file specifying execution of the application programs in the ETL system according to the developed execution sequence, wherein said means for generating comprises means for:
      receiving an input format representative of an input to the ETL system;
      receiving a report format representative of a report for a data warehouse to produce from data input according to the input format and stored in the data warehouse; and
      sequencing the application programs such that the application programs, when executed, transform the data input according to the input format to the report format prior to loading the data into the data warehouse.

32. The system of claim 31, further comprising means for generating an installation script for installing the generated configuration file and the application program on a computer such that the installed application program executes per the generated configuration file to implement the ETL system.

33. The system of claim 31, further comprising means for transforming the data via a sequence of operations.

* * * * *